US008462382B2

(12) United States Patent
Yamamoto

(10) Patent No.: US 8,462,382 B2

(45) Date of Patent: Jun. 11, 2013

(54) IMAGE FORMING APPARATUS FOR JUDGING MISREGISTRATION OF IMAGES AND CONTROL METHOD THEREOF

(75) Inventor: Kazuto Yamamoto, Koganei (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 509 days.

(21) Appl. No.: 12/758,909

(22) Filed: Apr. 13, 2010

(65) Prior Publication Data

US 2010/0271640 A1 Oct. 28, 2010

(30) Foreign Application Priority Data

Apr. 23, 2009 (JP) ................................ 2009-104758

(51) Int. Cl.
*G06K 15/10* (2006.01)

(52) U.S. Cl.
USPC ............. 358/1.5; 358/1.9; 358/2.1; 358/1.12; 358/1.18; 358/488; 347/116

(58) Field of Classification Search
USPC ... 358/1.5, 1.9, 2.1, 1.12, 1.18, 488; 347/116; 399/301; 3/1.5, 1.9, 2.1, 1.12, 1.18, 488
See application file for complete search history.

(56) References Cited

U.S. PATENT DOCUMENTS

| | | | | |
|---|---|---|---|---|
| 6,226,419 | B1 * | 5/2001 | Lodwick et al. | 382/294 |
| 2004/0036847 | A1 * | 2/2004 | Conrow et al. | 355/24 |
| 2008/0278757 | A1 * | 11/2008 | Wong | 358/1.18 |
| 2008/0279569 | A1 * | 11/2008 | Wong | 399/15 |

FOREIGN PATENT DOCUMENTS

| | | | |
|---|---|---|---|
| JP | 1-165443 | A | 6/1989 |
| JP | 5-8380 | A | 1/1993 |
| JP | 5-254105 | A | 10/1993 |
| JP | 2000-108358 | A | 4/2000 |
| JP | 2003-078742 | A | 3/2003 |
| JP | 2005-153374 | A | 6/2005 |
| JP | 2008-173877 | A | 7/2008 |
| JP | 2008-275991 | A | 11/2008 |
| JP | 2009-069396 | A | 4/2009 |

OTHER PUBLICATIONS

Office Action from Japanese Patent Office issued in corresponding Japanese Patent Application No. 2009-104758 dated Feb. 22, 2011, with an English translation thereof.

Office Action from Japanese Patent Office issued in corresponding Japanese Patent Application No. 2009-104758 dated Nov. 30, 2010, with an English translation thereof.

* cited by examiner

*Primary Examiner* — Jacky X Zheng

(74) *Attorney, Agent, or Firm* — Buchanan Ingersoll & Rooney PC

(57) ABSTRACT

An image forming apparatus including: an image forming section to form an image on a single side or both sides of a paper sheet based on job information of a job; and a control section to combine a registration image for judging misregistration of front and back images with each of front and back sample images of the job to allow the image forming section to form front and back combined images on the front and the back of the paper sheet, respectively, on which the front and back sample images are to be formed, respectively, when the image forming section forms the sample images at a preset sample print timing.

14 Claims, 13 Drawing Sheets

IMAGE FORMING APPARATUS FOR JUDGING MISREGISTRATION OF IMAGES AND CONTROL METHOD THEREOF

BACKGROUND OF THE INVENTION

1. Field of the Invention

This present invention relates to an image forming apparatus and a control method thereof.

2. Description of the Related Art

Currently, some of image forming apparatuses such as printers, copiers, scanners, and multifunction peripherals having their functions have a function to form images on both sides of a paper sheet. It is essential for those image forming apparatuses to adjust misregistration of the images formed on the front and the back of the paper sheet, respectively, in order that positions to form the images on the front and the back of the paper sheet are aligned.

For example, Japanese Patent Application Laid-Open Publication No. 2000-108358 discloses an ink-jet printer which prints on the front face and the rear face of continuous roll paper. The ink-jet printer prints a visual confirmation pattern composed of dots, which are uniformly scattered within a belt-shaped area extending in a width direction of the continuous roll paper, at a print start time, at a print end time, and during an optional print period so as to monitor a print state on the continuous roll paper by a print state of the visual confirmation pattern.

Japanese Patent Application Laid-Open Publication No. 5-8380 discloses a registering device which takes a photograph of top-side and rear-side registration marks formed on the top surface and the rear surface of printing paper, respectively, from the top surface of the printing paper for obtaining image information on the top-side and rear-side registration marks, calculates misregistration between the top-side and rear-side registration marks based on the image information, and gives a control signal to an image forming device so as to reduce the misregistration.

Japanese Patent Application Laid-Open Publication No. 5-254105 discloses a registration mark inspecting device including: two objectives which form front and rear registration mark images of a both-sided print and are arranged facing each other; one ocular for observing the front and rear registration mark images; and transmission optical systems for transmitting the respective images of the front and rear registration mark images formed by the respective objectives to the ocular by interconnecting respective optical axes of the two objectives to an optical axis of the ocular in a coaxial relation. One of the transmission optical systems has a reverse optical part which reverses a surface normal to the optical axis of one of the front and rear registration mark images, the registration mark image which is formed by the objective corresponding to the transmission optical system, in one direction by a reflection.

Japanese Patent Application Laid-Open Publication No. 2008-275991 discloses an image forming apparatus which reads a recording sheet of which front and back image position adjusting marks are formed on both sides, respectively, by irradiating the recording sheet with light from one side of the both sides of the recording sheet, detects the front image position adjusting mark on the one side thereof and the back image position adjusting mark on the other side thereof which is read through the one side thereof, and determines an adjustment value, so that the detected image position adjusting marks on the both sides thereof agree with each other.

However, in the related arts mentioned above, in order to check the misregistration caused on the front and the back of a paper sheet, a dedicated paper sheet for misregistration check, namely, the dedicated paper sheet of which marks (registration marks) for checking the misregistration of images formed on the front and the back of a paper sheet are formed on the front and the back, is needed to output. On the dedicated paper sheet for misregistration check, only the registration marks are formed in many cases. Therefore it is difficult for a user thereof to find exactly what kind of misregistration occurs to the images formed on the front and the back of a paper sheet.

Furthermore, the misregistration is often checked when a user notices the misregistration. Consequently, it is difficult to notice an occurrence of the misregistration in its early stage, and paper sheets are wasted when the paper sheets having the misregistration are output.

SUMMARY OF THE INVENTION

The present invention is made in view of the circumstances. It is an object of the present invention to improve operation efficiency of misregistration check of images formed on the front and the back of a paper sheet.

To solve at least one of the problems mentioned above, according to a first aspect of the present invention, an image forming apparatus includes: an image forming section to form an image on a single side or both sides of a paper sheet based on job information of a job; and a control section to combine a registration image for judging misregistration of front and back images with each of front and back sample images of the job to allow the image forming section to form front and back combined images on the front and the back of the paper sheet, respectively, on which the front and back sample images are to be formed, respectively, when the image forming section forms the sample images at a preset sample print timing. To solve at least one of the problems mentioned above, according to a second aspect of the present invention, a control method of an image forming apparatus having an image forming section to form an image on a single side or both sides of a paper sheet, the control method includes the steps of: receiving job information of a job; and combining a registration image for judging misregistration of the front and back images with each of front and back sample images of the job to allow the image forming section to form front and back combined images on the front and the back of the paper sheet, respectively, on which the front and back sample images are to be formed, respectively, when the image forming section forms the sample images at a preset sample print timing.

To solve at least one of the problems mentioned above, according to a third aspect of the present invention, an image forming apparatus includes: an image forming section to form an image on a single side or both sides of a paper sheet based on job information; and a control section to control the image forming section to form front and back sample images on the front and the back of the paper sheet, respectively, based on a sample page included in the job information, wherein the control section combines a registration image for judging misregistration of front and back images with each of the front and back sample images to allow the image forming section to form front and back combined images on the front and the back of the paper sheet, respectively, on which the front and back sample images are to be formed, respectively.

BRIEF DESCRIPTION OF THE DRAWINGS

The present invention will be understood fully from the detailed description given hereinbelow and the accompanying drawings, which are given by way of illustration only, and thus are not intended as a definition of the limits of the present invention, and wherein.

DESCRIPTION OF THE PREFERRED EMBODIMENT

Figure 1:
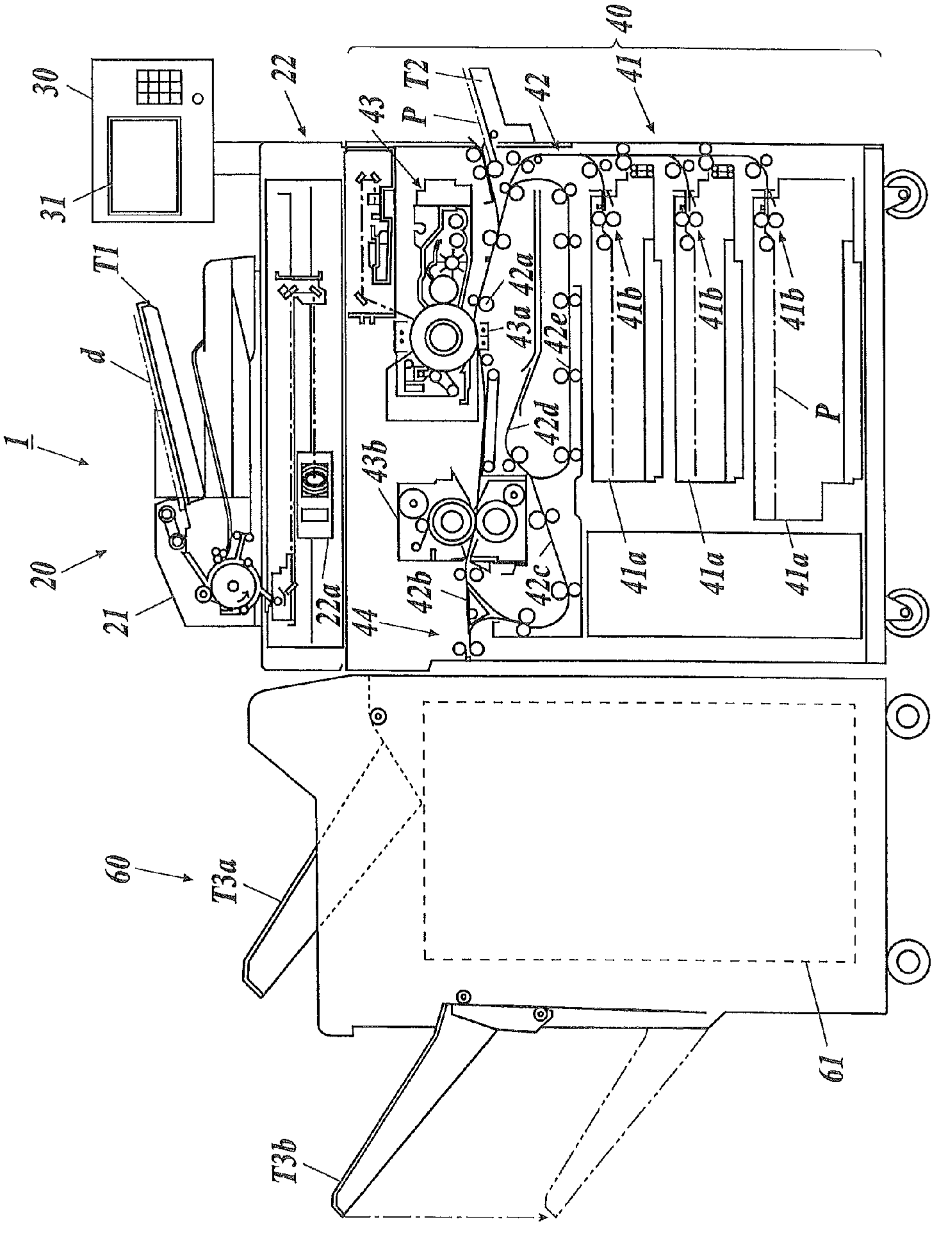
FIG. 1 is a schematic cross-sectional view showing a configuration of an image forming apparatus.

Hereinafter, an embodiment of the present invention is described in detail referring to the drawings.

First, a configuration of the present invention is described.

FIG. 1 shows a schematic cross-sectional view showing a configuration of an image forming apparatus 1 according to an embodiment of the present invention.

As shown in FIG. 1, the image forming apparatus 1 is a digital multifunction peripheral including a main body 1*a* and a finishing section 60 which executes finishing on a paper sheet P on which an image is formed. The main body 1*a* reads an image from a document d, and forms the read image on a paper sheet P. Also, the main body 1*a* receives job information of a job including page data having image data, setting information such as an image forming condition of the image data, and the like, from an external device 2 and the like, and forms an image on a paper sheet P based on the received job information. The main body 1*a* includes an image reading section 20, an operation display section 30, and a printing section 40.

The image reading section 20 includes an auto document sending section 21 called an auto document feeder (ADF) and a reading section 22. The image reading section 20 activates a function to read a plurality of images of a plurality of documents d according to an instruction received by the operation display section 30. A document d placed on a document tray T1 of the auto document sending section 21 is conveyed to a contact glass where readings are executed. Images on a single side or both sides of the document d are read on the contact glass by an optical system so as to be read by a charge coupled device (CCD) 22*a*. Hereinafter an image includes not only image data such as a figure and a photo but also text data such as a character and a symbol, and the like.

The operation display section 30 includes a liquid crystal display (LCD), a touch panel 31 provided such that the LCD is covered, and various kinds of operation keys (not shown). The operation display section 30 receives an instruction from a user, and outputs information of the instruction to a control section 110. Also, the operation display section 30 displays various kinds of setting screens to receive setting conditions, and displays results of various processing and the like in response to a display signal inputted from the control section 110.

A screen, for example, a setting screen for receiving an instruction on various pieces of setting information of a job to be executed, a screen for suspending the job in execution, a screen for re-starting the suspended job, or a screen for canceling the job in execution, is displayed on the touch panel 31 of the operation display section 30. An operation signal which indicates an instruction received by the screen displayed on the touch panel 31 is output to the control section 110 described below.

Figure 2:
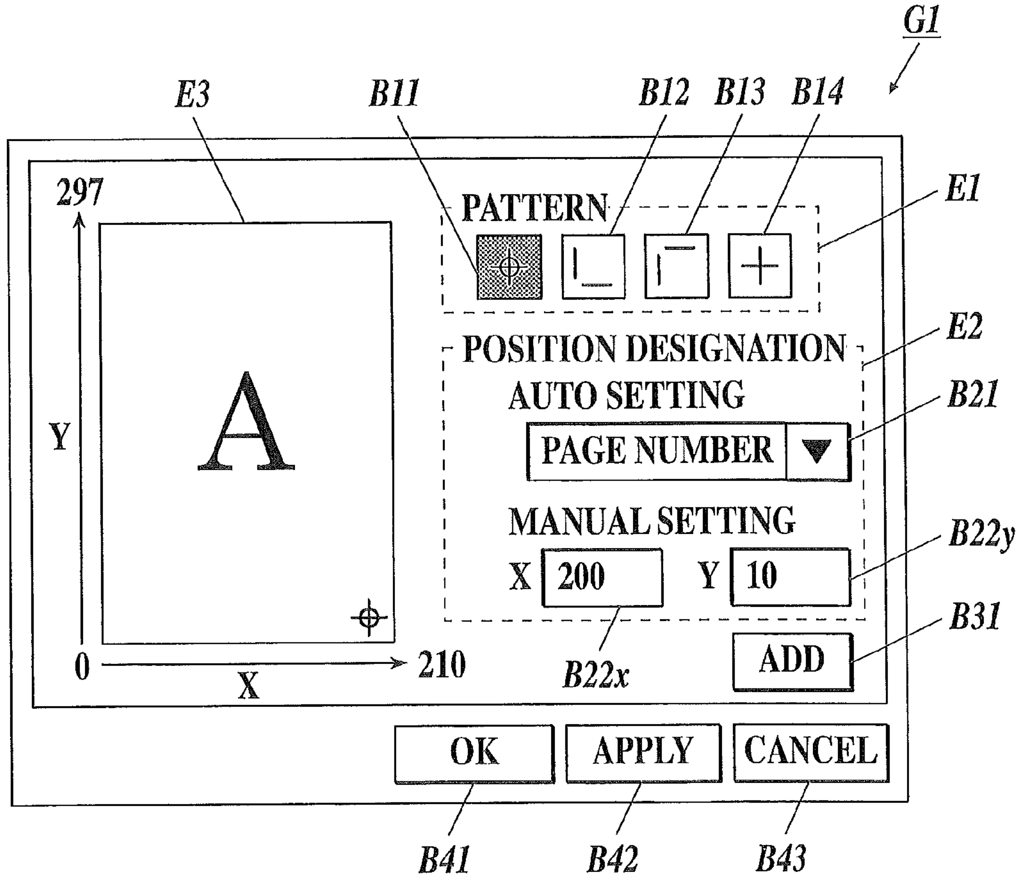
FIG. 2 shows an example of a registration mark setting screen.

A registration mark setting screen shown in FIG. 2 is also displayed on the touch panel 31 of the operation display section 30. An instruction received by the registration mark setting screen is output to the control section 110.

FIG. 2 shows an example of the registration mark setting screen.

A registration mark setting screen G1 shown in FIG. 2 is a screen for receiving registration mark setting information indicating a position to form a registration mark, an image (pattern) of the registration mark, and the like. The registration mark is a registration image to judge misregistration of an image formed on the front of a paper sheet P (front image) and an image formed on the back thereof (back image).

A pattern selection area E1, a position designation area E2, an output image area E3, an add button B31, an OK button B41, an apply button B42, a cancel button B43, and the like are provided on the registration mark setting screen G1 shown in FIG. 2.

Pattern selection buttons B11-B14 with each of which an image (pattern) to be formed as the registration mark is selected are provided in the pattern selection area E1.

The position designation area E2 is an area to receive an instruction on a position where the registration mark selected in the pattern selection area E1 is formed. With regard to the position where the registration mark is formed, a pull-down menu button B21 to select a position from a plurality of preset positions such as a position for a page number, and position designation buttons B22*x* and B22*y* to receive instructions on an x-coordinate and an y-coordinate of a position on a paper sheet P, respectively, are provided in the position designation area E2.

The add button B31 receives an instruction to add the registration mark selected in the pattern selection area E1 to the position determined from the position designation area E2. When the add button B31 is depressed, the registration mark selected in the pattern selection area E1 is displayed at the position in the output image area E3, the position which is determined from the position designation area E2.

The printing section 40 executes electro-photographic image forming processing based on inputted print data. The printing section 40 includes a paper feed section 41, a fed paper convey section 42, an image forming section 43, and a discharge section 44.

The paper feed section 41 includes a plurality of paper feed trays 41*a*, a paper feeder 41*b*, and a manual-bypass tray T2. Paper sheets P are preliminarily classified in size and/or type thereof so as to be placed in each of the plurality of paper feed trays 41*a*, and conveyed one by one from the top by the paper feeder 41*b* toward the fed paper convey section 42. Various sizes and/or types of paper sheets P can be placed on the manual-bypass tray T2 to meet users' needs. The paper sheets P placed on the manual-bypass tray T2 are conveyed one by one from the top by a paper feed roller toward the fed paper convey section 42.

The fed paper convey section 42 conveys a paper sheet P conveyed from the paper feed trays 41*a* or the manual-bypass tray T2 to a transfer device 43*a* through a plurality of intermediate rollers, a registration roller 42*a*, and the like.

The fed paper convey section 42 conveys the paper sheet P of which an image is formed on a single side to a circular paper path 42*c*, a reverse convey route 42*d*, and a fed paper re-convey route 42*e*, and then, again, to the transfer device 43*a* through the plurality of intermediate rollers, the registration roller 42*a*, and the like by using a convey route change board 42*b*.

The image forming section 43 includes a photo sensitive drum, a charging device, an exposure device, a developing device, the transfer device 43*a*, a cleaning section, and a fixing device 43*b* in order to activate a function to form an image on a single side or both sides of a paper sheet P based on the job information.

More specifically, an electrostatic latent image is formed by the exposure device on the photo sensitive drum which is charged by the charging device. Then, the developing device develops the electrostatic latent image by adhering a toner to a surface of the photo sensitive drum on which the electrostatic latent image is formed. A toner image formed on the photo sensitive drum by the developing device is transferred onto a paper sheet P at the transfer device 43*a*. The remaining tonner and the like are removed from the surface of the photo sensitive drum by the cleaning section after the tonner image is transferred onto the paper sheet P.

The fixing section 43*b* heat-fixes the tonner image transferred onto the paper sheet P, the paper sheet P which is conveyed by the fed paper convey section 42. The paper sheet P on which the fixing processing is executed is conveyed from a discharge exit of the discharge section 44 to the finishing section 60 by being held between paper ejection rollers of the discharge section 44.

The finishing section 60 includes a finishing unit 61 having various kinds of divisions such as a sort division to sort a paper sheet P on which an image is formed, a punch division to punch holes in a paper sheet P, a staple division to staple a sheaf of paper sheets P at a preset position, a folding division to fold a paper sheet P, and a cutting division to cut a paper sheet P, and ejection trays T3*a* and T3*b* where a paper sheet P on which an image is formed by the main body 1*a* and a paper sheet P on which a finishing is executed thereafter are ejected and placed.

Figure 3:
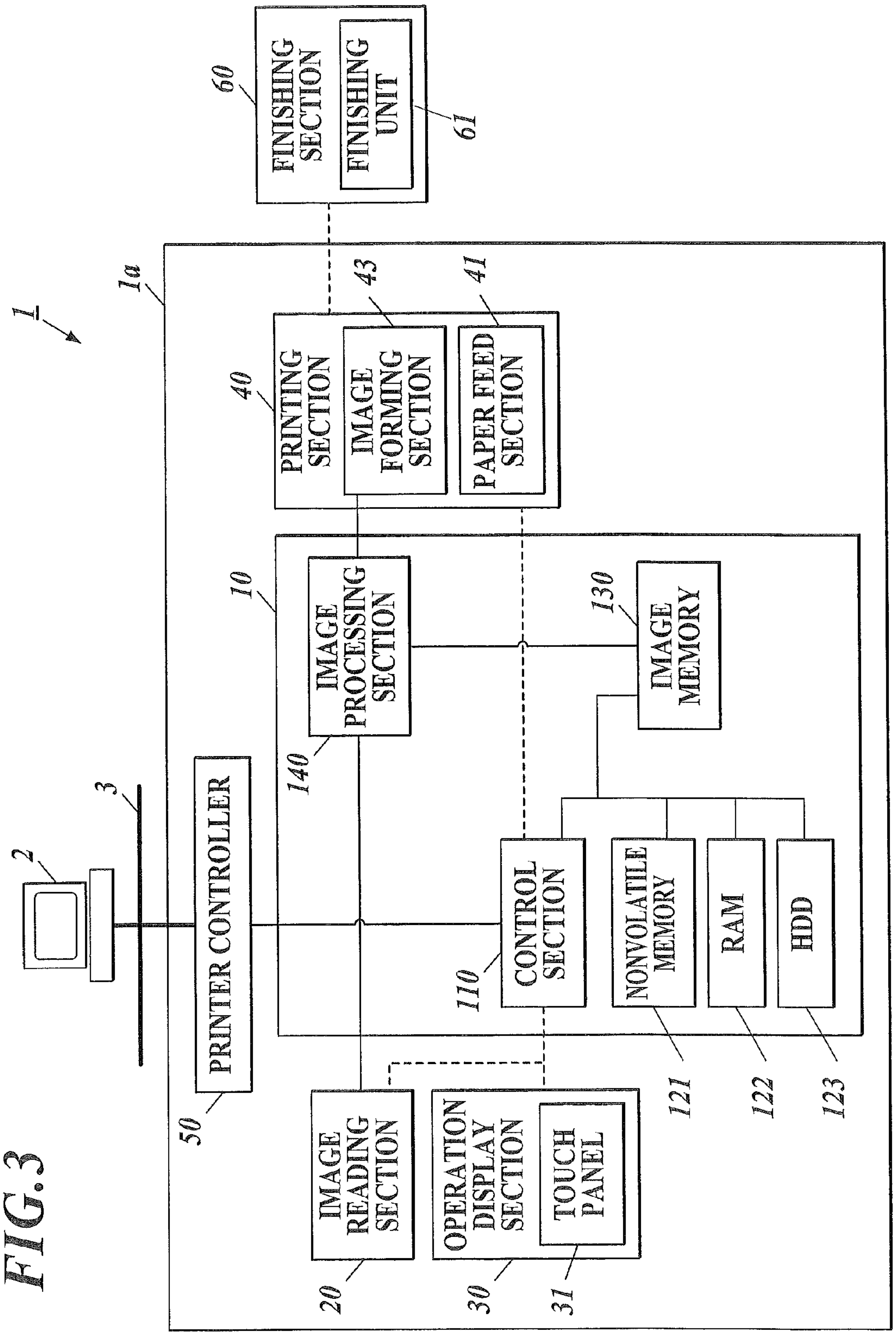
FIG. 3 is a control block diagram of the image forming apparatus.

FIG. 3 shows a control block diagram of the image forming apparatus 1.

As shown in FIG. 3, the image forming apparatus 1 includes the main body 1*a*, and the finishing section 60 connected to the main body 1*a*. The main body 1*a* includes a main body control section 10, the image reading section 20, the operation display section 30, the printing section 40, and a printer controller 50.

The image forming apparatus 1 is connected to the external device 2 on a network 3 via the printer controller 50 so as to transmit and receive information with each other.

The main body control section 10 includes the control section 110, a nonvolatile memory 121, a random access memory (RAM) 122, a hard disk drive (HDD) 123, an image memory 130, and an image processing section 140. These sections and the like of the main body control section 10 are controlled by the control section 110.

The control section 110 includes a central processing unit (CPU). The control section 110 reads a specified program from a system program and various kinds of application programs which are stored in the nonvolatile memory 121, and expands the read program in the RAM 122. In cooperation with the program expanded in the RAM 122, the control section 110 executes various processing for centralized control of the sections and the like composed of the image forming apparatus 1.

For example, the control section 110 changes modes among a copy mode, a print mode, and a scan mode to control copying, printing, image data reading, respectively, in response to an instruction signal inputted from the operation display section 30 or the external device 2.

Furthermore, the control section 110 reads a front-back misregistration checking processing program according to the embodiment of the present invention, various pieces of data required for the program, and the like from the nonvolatile memory 121, the HDD 123, or the like. In cooperation with the program and the data, the control section 110 controls front-back misregistration checking processing.

In the front-back misregistration checking processing, when sample print processing is executed, a registration mark is combined with each of front and back sample images at a position on the front and the back of a paper sheet P, respectively, to allow the image forming section 43 to form front and back combined images on the front and the back of the paper sheet P, respectively, on which the front and back sample images are to be formed, respectively, so as to output the front and back combined images. The image (pattern) of the registration mark and the position to form the registration mark are preset from the registration mark setting screen G1 and the like.

The registration mark may be combined with each of the front and back sample images every time the sample print processing is executed. However, in the embodiment of the present invention, the registration mark is combined with each of the front and back sample images when an event which becomes a causing factor for misregistration of the front and back images formed on the front and the back of a paper sheet P, respectively, occurs before a sample print timing of the sample print processing. The event which becomes the causing factor for the misregistration is described in detail below referring to the flow chart of FIG. 12.

The sample print processing is processing to form the front and back sample images by the image forming section 43 at a preset timing (sample print timing) to be output. As the sample print timing, a timing at which the predetermined number of paper sheets P is output can be used, for example. As the front and back sample images, images of page data of a job which is being executed at a sample print timing can be used, for example.

The nonvolatile memory 121 stores various kinds of processing programs and data pertaining to image formation, the front-back misregistration checking processing program according to the embodiment of the present invention, data processed by those programs, and the like.

The RAM 122 forms a work area to temporarily store various kinds of programs run by the control section 110, data of the programs, and the like.

The HDD 123 stores the job information received by the operation display section 30 or the external device 2, the registration mark setting information inputted from the operation display section 30 or preset, and various pieces of setting information.

The image memory 130 includes a hard disk drive (HDD) and a dynamic RAM (DRAM), and stores image data so as to be read and written. The image memory 130 stores and saves image data of the job information inputted from the image reading section 20 or the printer controller 50, and also reads the image data stored in the image memory 130 itself to output the read image data to the image processing section 140, according to an instruction from the control section 110.

The image processing section 140 executes various kinds of image processing such as screen processing to the image data inputted from the image reading section 20, the printer controller 50, or the image memory 130, and then outputs the processed image data to the control section 110 or the image memory 130. For example, the image processing section 140 converts an analogue image signal inputted from the image reading section 20 into digital image data, compresses digital image data to output the compressed digital image data to the image memory 130, or expands compressed digital image data to output the expanded digital image data.

The image reading section 20 includes the auto document sending section 21, the reading section 22, which are shown in FIG. 1, and an image reading control section. The image reading control section controls the auto document sending section 21, the reading section 22, and the like to execute exposure scanning through a surface of a document d, and then allows the CCD 22*a* to perform photoelectric conversion of the reflected light so as to read an image on the document d. The data of the read image is output to the image processing section 140.

The operation display section 30 includes the touch panel 31 shown in FIG. 1, the LDC, a set of various kinds of operation keys, and an operation display control section. The operation display control section displays the various kinds of setting screens for inputting the setting conditions, and displays the results of various processing and the like on the LCD in response to a display signal inputted from the control section 110. Furthermore, the operation display control section outputs an operation signal, which is input from the set of various kinds of operation keys or the touch panel 31, to the control section 110.

The printing section 40 includes the paper feed section 41, the image forming section 43, and other components, which pertain to printing, and a printing control section. the paper feed section 41 and the image forming section 43 are shown in FIG. 1. The printing control section controls operation of these sections and the like of the printing section 40 according to an instruction from the control section 110 so as to form an image on a paper sheet P based on the print data inputted from the image processing section 140. The printing control section also outputs an instruction signal to a finishing control section, the instruction signal to operate each component of the finishing section 60, according to an instruction from the control section 110.

The printer controller 50 manages and controls a job sent from the external device 2 such as a personal computer (PC) connected to the network 3 such as a local area network (LAN) to the image forming apparatus 1 when the image forming apparatus 1 is used as a network printer. The printer controller 50 receives data for printing from the external device 2, and outputs the data as the job information to the control section 110.

The finishing section 60 includes the finishing unit 61 having the various kinds of divisions, a plurality of conveying members such as a convey roller to convey a paper sheet P to one of the divisions of the finishing unit 61, and the ejection trays T3*a* and T3*b* to which a paper sheets P conveyed from the divisions of the finishing unit 61 is ejected. The divisions of the finishing unit 61 are all controlled by the finishing control section provided in the finishing section 60. The finishing control section conveys a paper sheet P to a certain division of the finishing unit 61 along a conveying path, controls operation of each division of the finishing unit 61 to execute a certain finishing to the paper sheet P, and then ejects the paper sheet P to a certain ejection tray of the ejection trays T3*a* and T3*b*, in response to an instruction signal for finishing inputted from the control section 110 via the printing control section.

Next, operation of the image forming apparatus 1 according to the embodiment of the present invention is described.

Figure 4:
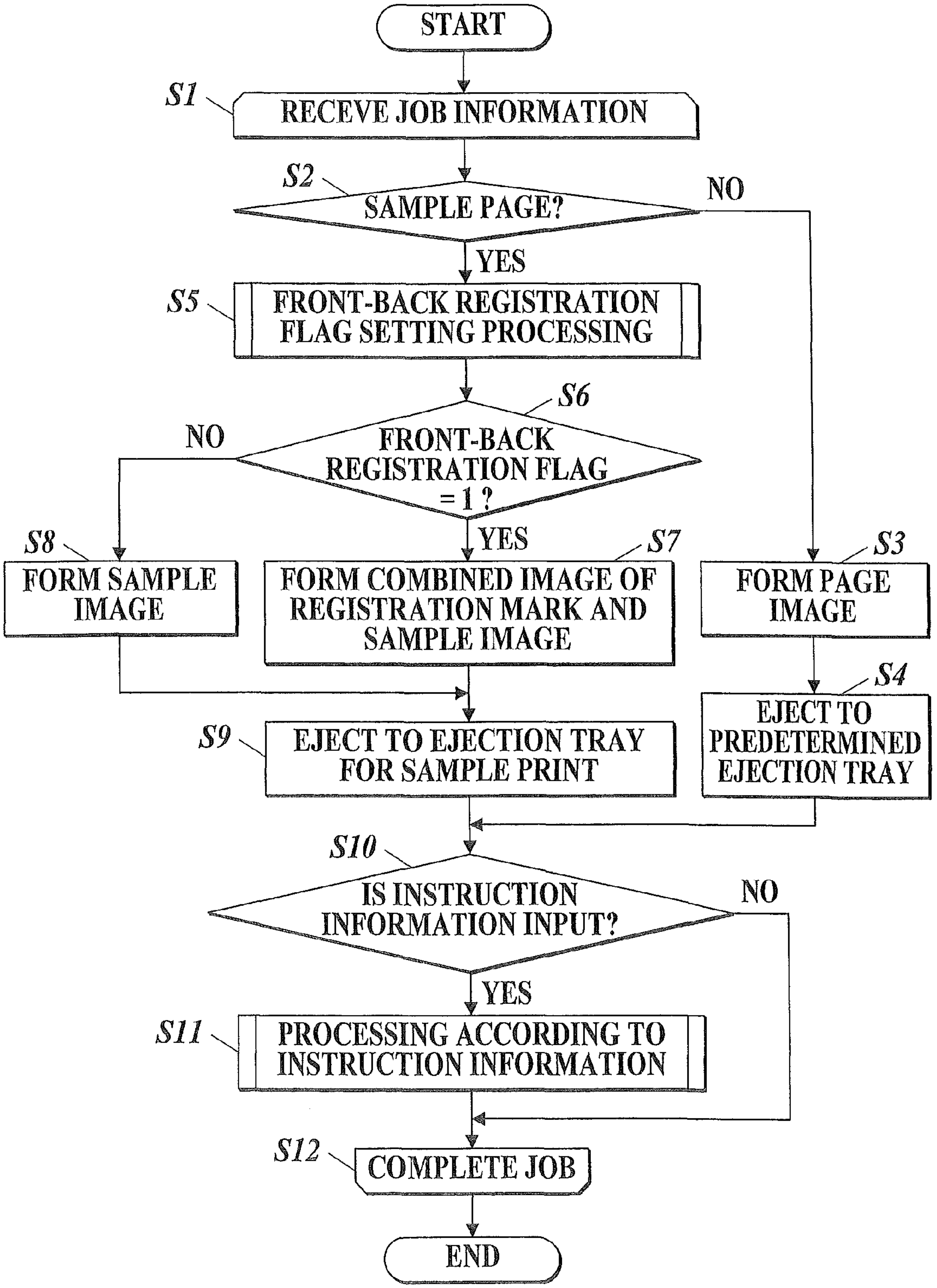
FIG. 4 is a flow chart of front-back misregistration checking processing.

FIG. 4 shows a flow chart of the front-back misregistration checking processing according to the embodiment of the present invention. The front-back misregistration checking processing shown by the flow chart of FIG. 4 is executed by the control section 110 and the sections and the like of the image forming apparatus 1 working together.

The control section 110 waits until job information is received. When the job information is received (Step S1), the following steps of the front-back misregistration checking processing are repeated until a job according to the received job information is completed.

The control section 110 judges whether a page currently being executed of the job in execution (current page hereinafter) is a page being executed at a sample print timing (sample print page) or not (Step S2). When the current page is not the sample print page (Step S2; NO), the control section 110 allows the image forming section 43 to form a page image based on the page data of the current page on a paper sheet P (Step S3), and ejects the paper sheet P on which the page image is formed to an ejection tray of the ejection trays T3*a* and T3*b*, the ejection tray which is predetermined by the page data (Step S4).

When the current page is the sample print page (Step S2; YES), the control section 110 executes front-back registration flag setting processing described below (Step S5), and judges whether a front-back registration flag is "1" or not (Step S6).

When the front-back registration flag is "1" (Step S6; YES), the control section 110 combines image data of a registration mark (front-back registration image data) with each of front and back sample image data at a preset position on the front and the back of a paper sheet P, respectively, so as to create front and back combined image data, respectively. Then, the control section 110 allows the image forming section 43 to form a front combined image on the front and a back combined image on the back of a paper sheet P based on the front and back combined image data, respectively (Step S7). The front-back registration image data is preset in the page data (sample image data) of the sample print page.

Figure 5A:
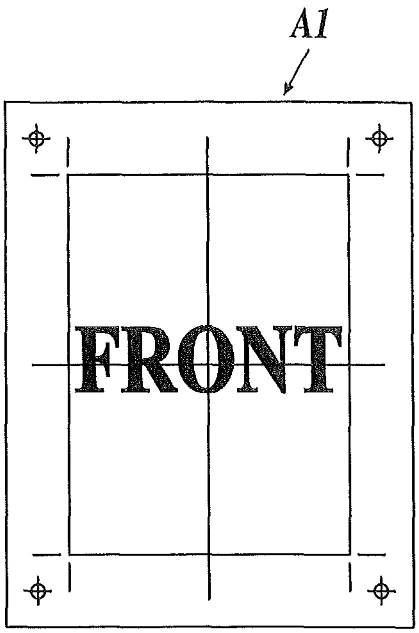
FIGS. 5A and 5B show an example of front-back registration image data.
Figure 5B:
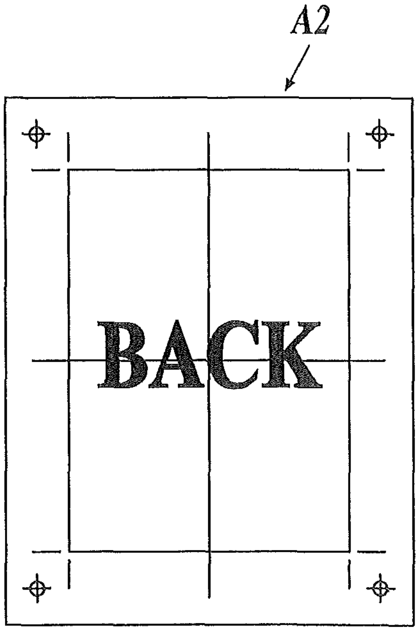
Figure 6A:
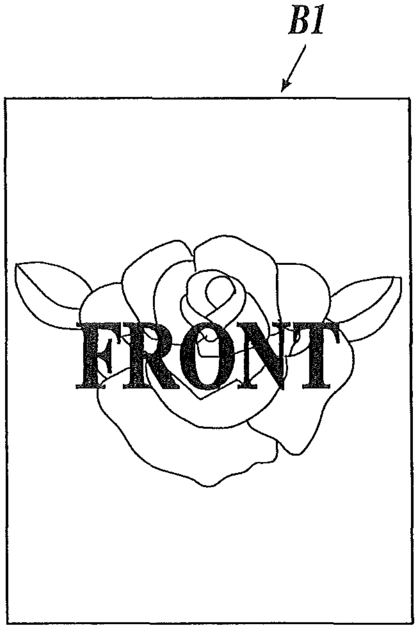
FIGS. 6A and 6B show examples of front and back sample image data, respectively.
Figure 6B:
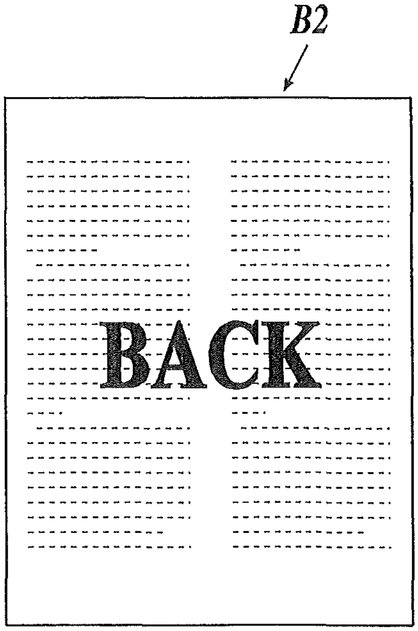
Figure 7A:
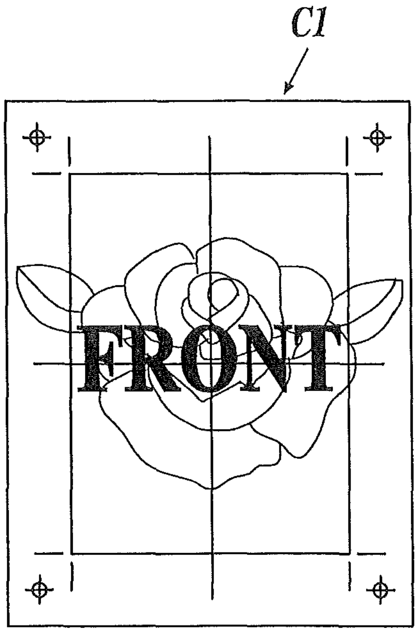
FIGS. 7A and 7B show examples of front and back combined image data, respectively.
Figure 7B:
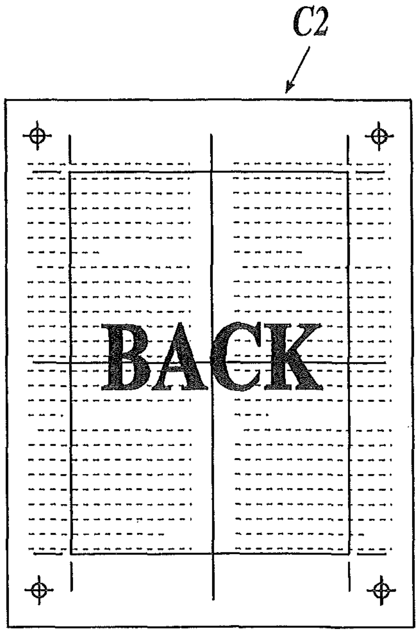
Figure 8A:
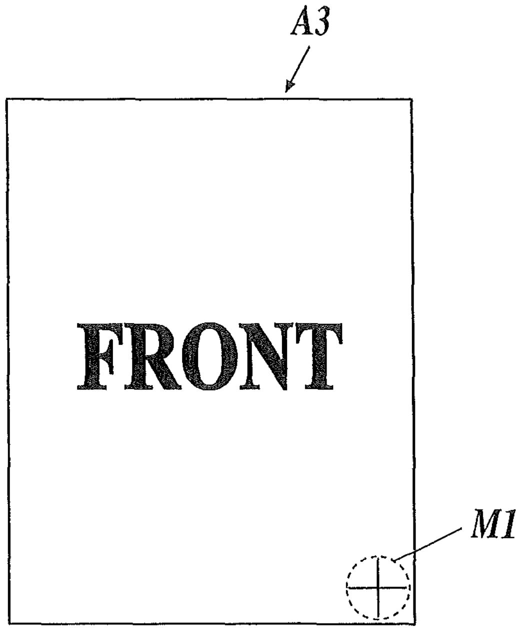
FIGS. 8A and 8B show another example of front-back registration image data.
Figure 8B:
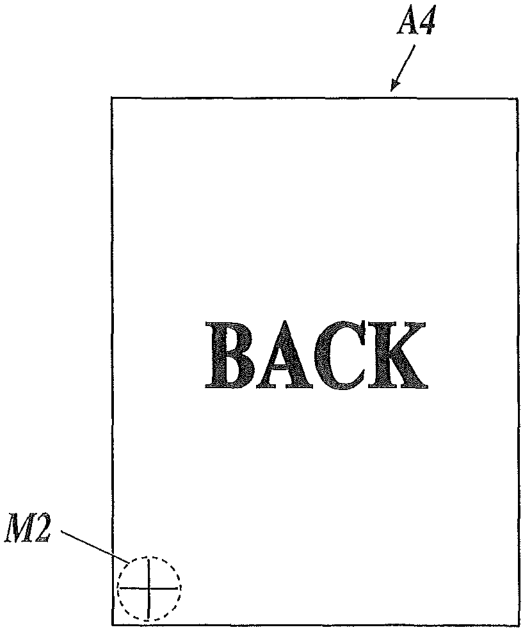

FIGS. 5A-5B show an example of the front-back registration image data, and FIGS. 8A-8B show another example thereof. FIGS. 6A-6B show examples of the front and back sample image data, respectively, and 9A-9B show other examples of the front and back sample image data, respectively. FIGS. 7A-7B show examples of the front and back combined image data, respectively, and 10A-10B show other examples of the front and back combined image data, respectively.

In the front-back registration image data shown in FIGS. 5A-5B and 8A-8B, the front and back sample image data shown in FIGS. 6A-6B and 9A-9B, and the front and back combined image data shown in FIGS. 7A-7B and 10A-10B, either a FRONT to indicate the front of a paper sheet P or a BACK to indicate the back of the paper sheet P is written so as to distinguish between the front and the back thereof.

FIG. 5A shows front-back registration image data A1 created on the front of a paper sheet P, and FIG. 5B shows front-back registration image data A2 created on the back of the paper sheet P based on the registration mark setting information which is preset. FIG. 6A shows front sample image data B1 created on the front of the paper sheet P, and FIG. 6B shows back sample image data B2 created on the back of the paper sheet P. FIG. 7A shows front combined image data C1 created on the front of the paper sheet P, and FIG. 7B shows back combined image data C2 created on the back of the paper sheet P.

As shown in FIG. 7A, the front combined image data C1 created on the front of the paper sheet P is image data in which the front-back registration image data A1 and the front sample image data B1 are combined. As shown in FIG. 7B, the back combined image data C2 created on the back of the paper sheet P is image data in which the front-back registration image data A2 and the back sample image data B2 are combined. Front and back combined images based on the front combined image data C1 and the back combined image data C2 are formed on the front and the back of the paper sheet P, respectively.

FIG. 8A shows front-back registration image data A3 created on the front of a paper sheet P, and FIG. 8B shows front-back registration image data A4 created on the back of the paper sheet P based on the registration mark setting information set from the registration mark setting screen G1.

The front-back registration image data A3 and A4 shown in FIGS. 8A and 8B, respectively, include registration mark image data M1 and M2, respectively. In the registration mark image data M1 and M2, a pattern of the registration mark is set to +, and a position of the registration mark is set to a PAGE NUMBER.

Figure 9A:
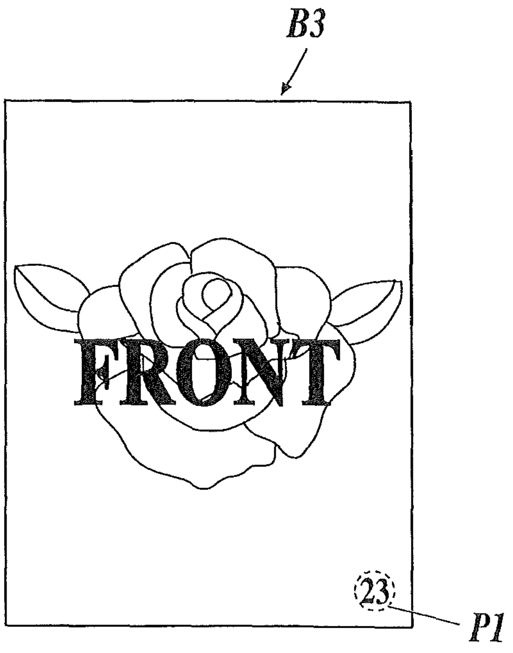
FIGS. 9A and 9B show other examples of front and back sample image data, respectively.
Figure 9B:
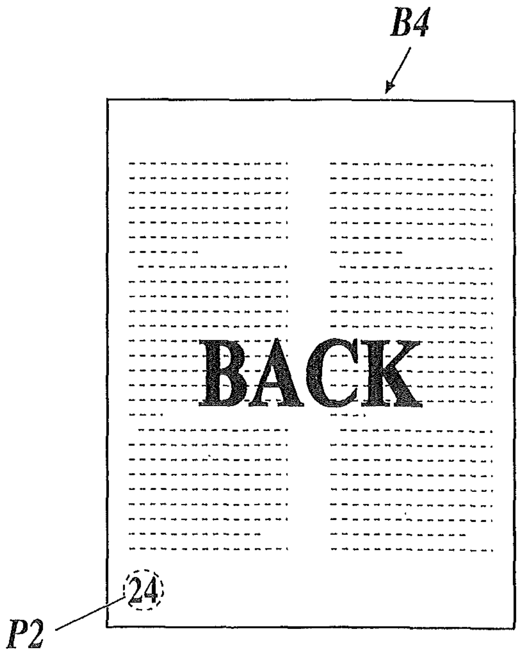

FIG. 9A shows front sample image data B3 created on the front of the paper sheet P, and FIG. 9B shows back sample image data B4 created on the back of the paper sheet P. The front sample image data B3 and the back sample image data B4 shown in FIGS. 9A and 9B, respectively, include page number image data P1 and P2 at a preset position, respectively.

Figure 10A:
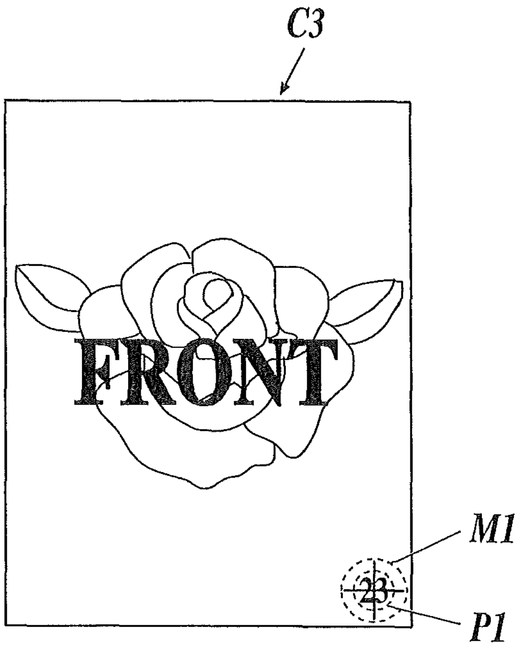
FIGS. 10A and 10B show other examples of front and back combined image data, respectively.
Figure 10B:
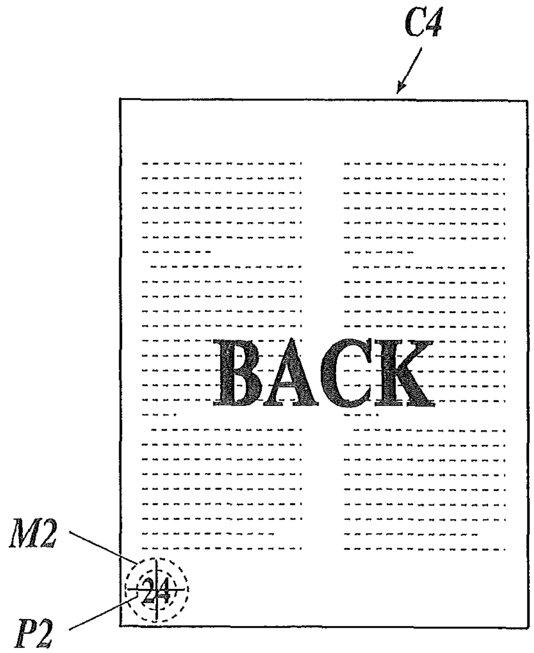

FIG. 10A shows front combined image data C3 created on the front of the paper sheet P, and FIG. 10B shows back combined image data C4 created on the back of the paper sheet P.

As shown in FIG. 10A, the front combined image data C3 created on the front of the paper sheet P is image data in which the front-back registration image data A3 and the front sample image data B3 are combined, so that the registration mark image data M1 is combined with the page number image data P1 at the position of the page number image data P1 of the front sample image data B3.

As shown in FIG. 10B, the back combined image data C4 created on the back of the paper sheet P is image data in which the front-back registration image data A4 and the back sample image data B4 are combined, so that the registration mark image data M2 is combined with the page number image data P2 at the position of the page number image data P2 of the back sample image data B4.

Front and back combined images based on the front combined image data C3 and the back combined image data C4 are formed on the front and the back of the paper sheet P, respectively.

When the front-back registration flag is not "1", namely, the front-back registration flag is "0" (Step S6; NO), the control section 110 allows the image forming section 43 to form a front sample image on the front and a back sample image on the back of a paper sheet P based on the front sample image data and the back sample image data of the sample print page (Step S8).

After Step S7 or Step S8, the control section 110 ejects the paper sheet P on which at least the front and back sample images are formed to one of the ejection trays T3*a* and T3*b* which is set for a sample print (Step S9).

After Step S4 or Step S9, the control section 110 judges whether instruction information is input from the operation display section 30 or not (Step S10). When the instruction information is input from the operation display section 30 (Step S10; YES), the control section 110 executes processing according to instruction information (Step S11).

When the instruction information is not input from the operation display section 30 (Step S10; NO) or after Step S11, the control section 110 ends the front-back misregistration checking processing in a case where the job is completed (Step S12), and the control section 110 returns to Step S1 in a case where the job is not completed.

Figure 11:
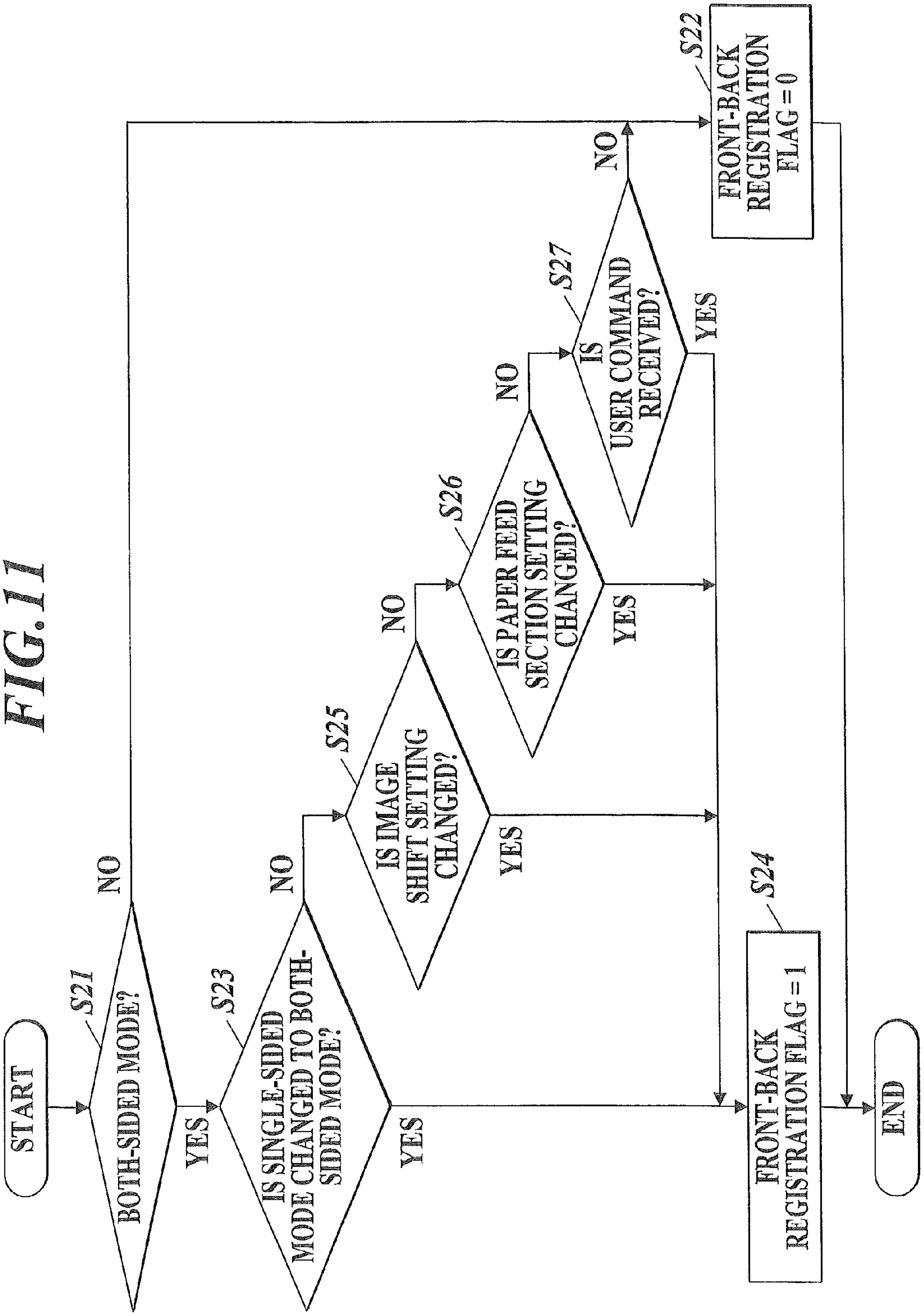
FIG. 11 is a flow chart of front-back registration flag setting processing.

FIG. 11 shows the flow chart of the front-back registration flag setting processing according to the embodiment of the present invention executed at Step S5. The front-back registration flag setting processing shown by the flow chart of FIG. 11 is executed by the control section 110 and the sections and the like of the image forming apparatus 1 working together.

The control section 110 judges whether the job being executed is set to a both-sided mode or not (Step S21). The both-sided mode is a mode to form a front image on the front and a back image on the back of a paper sheet P.

When the job being executed is not set to the both-sided mode (Step S21; NO), the control section 110 sets the front-back registration flag to "0" (Step S22), and ends the front-back registration flag setting processing.

When the job being executed is set to the both-sided mode (Step S21; YES), the control section 110 judges whether a job set to a single-sided mode is executed prior to the job currently being executed or not, namely, whether there is a change from a job in the single-sided mode to a job in the both-sided mode for the job currently being executed or not (Step S23).

When there is a change from a job in the single-sided mode to a job in the both-sided mode (Step S23; YES), the control section 110 sets the front-back registration flag to "1" (Step S24), and ends the front-back registration flag setting processing.

When there is no change from a job in the single-sided mode to a job in the both-sided mode (Step S23; NO), the control section 110 judges whether an image shift setting is changed between the current sample print timing and the preceding sample print timing or not (Step S25). The image shift setting is a setting for adjusting a position of a front image formed on the front and/or a position of a back image formed on the back of a paper sheet P (i.e. setting by image shift processing). The change of the image shift setting includes a change of a position of a front image formed on the front and/or a position of a back image formed on the back of a paper sheet P by executing image shift processing. The image shift processing is described below.

When the image shift setting is changed, namely, the position of the front image formed on the front and/or the position of the back image formed on the back of the paper sheet P is adjusted (Step S25; YES), the control section 110 moves to Step S24. When the image shift setting is not changed (Step S25; NO), the control section 110 judges whether a setting of the paper feed section 41 is changed between the current sample print timing and the preceding sample print timing or not (Step S26).

The change of the setting of the paper feed section 41 includes a change of a size and/or a type of a paper sheet P stored in the paper feed trays 41*a* of the paper feed section 41, a refill of a paper sheet P for the paper feed trays 41*a*, and a change of the paper feed trays 41*a* from which a paper sheet P is fed while a job is executed.

When the setting of the paper feed section 41 is changed, (Step S26; YES), the control section 110 moves to Step S24. When the setting of the paper feed section 41 is not changed (Step S 26; NO), the control section 110 judges whether command information (user command) for combining a registration image with each of front and back sample images is received or not (Step S27).

The command information for combining a registration image with each of front and back sample images is input from the operation display section 30 or the external device 2 by a user in advance. That is to say, the operation display section 30 or the external device 2 functions as a registration image combining destination input section to receive the command information.

When the command information is received (Step S27; YES), the control section 110 moves to Step S24. When the command information is not received (Step S27; NO), the control section 110 moves to Step S22.

The events judged at Steps S23, S25, and S26 are events which become causing factors for misregistration of a front image formed on the front and a back image formed on the back of a paper sheet P. Other events which become the causing factors may be maintenance of the image forming apparatus 1, recovery from an error such as a jam, execution of a job after the image forming processing is not executed for a preset period of time (sleep period), continuation of a job for a certain period of time, and the like.

Such other events which become the causing factors and the events indicated at Steps S23, S25, and S26 may be combined. Also, the order of the judgments of the events which become the causing factors is not limited to the order described above.

Figure 12:
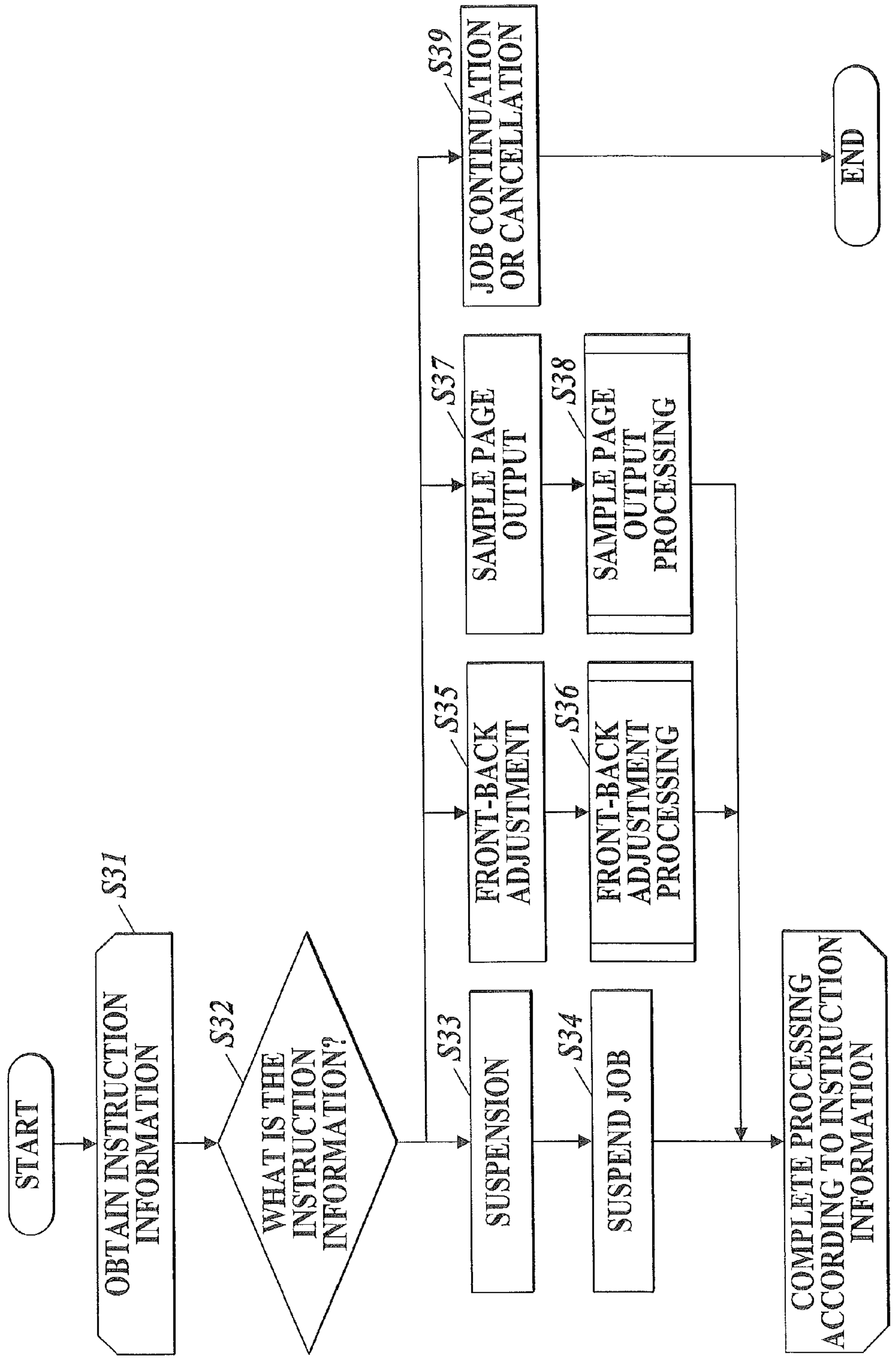
FIG. 12 is a flow chart of processing according to instruction information.

FIG. 12 shows a flow chart of the processing according to instruction information executed at Step S11 in accordance with the embodiment of the present invention. The processing according to instruction information shown by the flow chart of FIG. 12 is executed by the control section 110 and the sections and the like of the image forming apparatus 1 working together.

The control section 110 waits for instruction information to be obtained from the operation display section 30 or the external device 2. When the control section 110 obtains the instruction information from the operation display section 30 or the external device 2 (Step S31), the following steps of the processing according to instruction information are repeated until the processing according to the obtained instruction information is completed.

The control section 110 identifies which instruction information the control section 110 obtains (Step S32). When the instruction information is instruction information on suspension (Step S33), the control section 110 suspends the job currently being executed (Step S34).

When the instruction information is adjustment instruction information (front-back adjustment information) on a position of a front image formed on the front and/or a position of a back image formed on the back of a paper sheet P (Step S35), the control section 110 executes front-back adjustment processing (Step S36).

For the front-back adjustment processing of Step S36, the image shift processing can be used.

Figure 13:
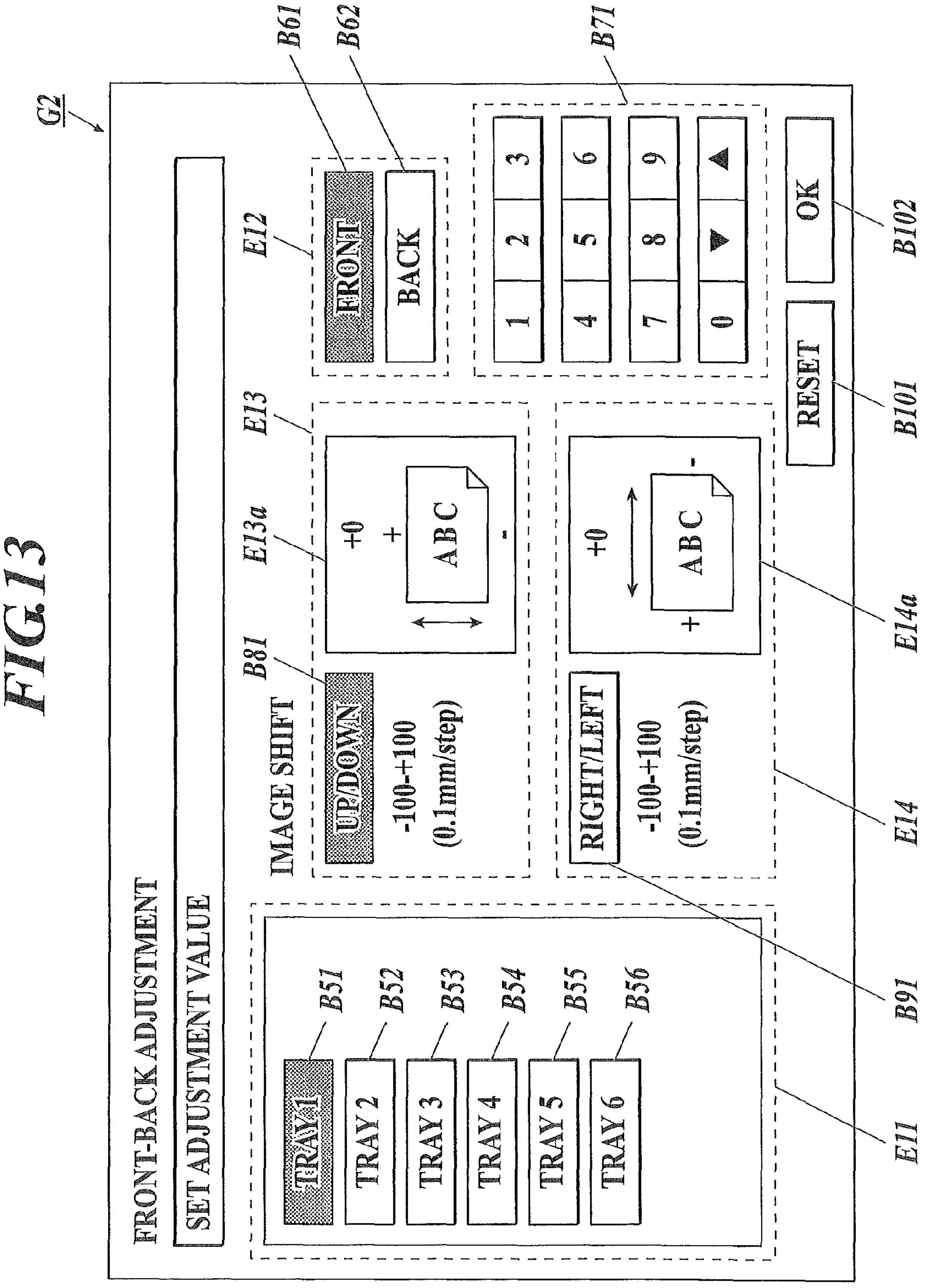
FIG. 13 shows an example of a front-back adjustment screen.

The control section 110, for example, displays a front-back adjustment screen G2 shown in FIG. 13 on the touch panel 31 of the operation display section 30 to receive the front-back adjustment information when the image shift processing is executed. Then, the control section 110 adjusts the position of the front image formed on the front and/or the position of the back image formed on the back of the paper sheet P according to the front-back adjustment information. That is to say, the front-back adjustment screen G2 functions as an adjustment value input section to receive the adjustment instruction information on a position of a front image formed on the front and/or a position of a back image formed on the back of a paper sheet P.

A tray selection area E11, a front/back selection area E12, an up/down selection area E13, a right/left selection area E14, a numeric keypad B71 including a plus key and a minus key, a reset button B101, an OK button B102, and the like are provided on the front-back adjustment screen G2 shown in FIG. 13.

Tray selection buttons B51-B56 are provided in the tray selection area E11. Each of the tray selection buttons B51-B56 can select one of the paper feed trays 41*a* of the paper feed section 41, and one of the tray selection buttons B51-B56 can be accepted at a time.

A front selection button B61 for selecting the front of a paper sheet P and a back selection button B62 for selecting the back of a paper sheet P are provided in the front/back selection area E12. One of the front selection button B61 and the back selection button B62 can be accepted at a time.

An up/down selection button B81 and an up/down shift image area E13*a* are provided in the up/down selection area E13. In the up/down shift image area E13*a*, a shift image is displayed, the shift image which is moved from a predetermined position on a paper sheet P a distance up or down corresponding to an adjustment value inputted from the numeric keypad B71.

A right/left selection button B91 and a right/left shift image area E14*a* are provided in the right/left selection area E14. In the right/left shift image area E14*a*, a shift image is displayed, the shift image which is moved from a predetermined position on a paper sheet P a distance right or left corresponding to an adjustment value inputted from the numeric keypad B71.

For example, when an adjustment value is input from the numeric keypad B71 after the tray selection button B51 for a tray 1 in the tray selection area E11, the front selection button B61 in the front/back selection area E12, and the up/down selection button B81 in the up/down selection area E13 are selected, a front image formed on the front of a paper sheet P stored in the tray 1 is set to move from a predetermined position a distance up or down corresponding to the adjustment value inputted from the numeric keypad B71.

When the instruction information is instruction information on output of a sample page (Step S37), the control section 110 executes sample page output processing (Step S38).

A paper sheet P on which front and back sample images are formed is output by the sample page output processing at Step S38. The front and back sample images formed on the paper sheet P are front and back sample images which are formed on a paper sheet P outputted just before the processing according to instruction information. For example, when the front and back sample images formed on the paper sheet P outputted just before the processing according to instruction information are a front combined image of a registration image and the front sample image and a back combined image of the registration image and the back sample image, a paper sheet P on which the front and back combined images are formed is output. When the front and back sample images formed on a paper sheet P outputted just before the processing according to instruction information are front and back sample images, a paper sheet P on which the front and back sample images are formed is output.

The operation display section 30 or the external device 2 functions as a job execution instruction input section which receives instruction information on continuation of a job or on cancellation of a job. When the instruction information is the instruction information on continuation of a job or on cancellation of a job (Step S39), and of which the instruction information on continuation of a job is received, the control section 110 continues the job being executed at a sample print timing, completes the processing according to instruction information, and then returns, to Step S1. When the instruction information on cancellation of a job is received, the control section 110 cancels the job being executed at a sample print timing, and then moves to Step S12 so as to end the job.

As described above, according to the embodiment of the present invention, when the image forming section 43 forms front and back sample images on the front and the back of a paper sheet P, respectively, at a sample print timing, so as to output the front and back sample images, a registration image is combined with each of the front and back sample images at a position on the front and the back of the paper sheet P, respectively, on which the front and back sample images are to be formed, respectively, to allow the image forming section 43 to form front and back combined images so as to output the front and back combined images. As a result, output of the dedicated paper sheet for misregistration check to check the misregistration of a front image formed on the front and a back image formed on the back of a paper sheet P is not required. In addition, since the registration image is formed with each of the front and back sample images, a user can easily find the misregistration caused on the front and the back of the paper sheet P in detail. Furthermore, since a timing to check the misregistration caused on the front and the back of the paper sheet P is the sample print timing, the misregistration can be checked regularly.

Therefore, working efficiency for checking the misregistration caused on the front and the back of the paper sheet P can be improved.

In particular, when a job being executed at the sample print timing is set to the both-sided mode, the registration image can be combined with each of the front and back sample images to allow the image forming section 43 to form the front and back combined images, respectively, so as to output the front and back combined images. As a result, when the job in the both-sided mode is executed, and the front and back sample images are formed and output, the front and back sample images and the misregistration caused on the front and the back of the paper sheet P can be checked at the same time.

Furthermore, when the event which becomes the causing factor for the misregistration of the front image formed on the front and the back image formed on the back of the paper sheet P occurs before the sample print timing, the registration image can be combined with each of the front and back sample images to allow the image forming section 43 to form the front and back combined images, respectively, so as to output the front and back combined images. As a result, the misregistration is not unnecessarily checked, and also early detection of the misregistration can be facilitated.

When, as the event being the causing factor for the misregistration, a job in the single-sided mode is executed before a job in the both-sided mode which is being executed at the sample print timing, the registration image can be combined with each of the front and back sample images to allow the image forming section 43 to form the front and back combined images, respectively, so as to output the front and back combined images. As a result, the misregistration caused on the front and the back of the paper sheet P can be checked when the conveying path of the paper sheet P is changed from a conveying path for the single-sided mode to a conveying path for the both-sided mode, which easily causes the misregistration.

When, as the event being the causing factor for the misregistration, the processing to adjust a position of the front image formed on the front and/or a position of the back image formed on the back of the paper sheet P is executed between the sample print timing and the preceding sample print timing, the registration image can be combined with each of the front and back sample images to allow the image forming section 43 to form the front and back combined images, respectively, so as to output the front and back combined images. As a result, the misregistration caused on the front and the back of the paper sheet P can be checked when the position of the front image and/or the position of the back image formed on the paper sheet P is adjusted, which easily causes the misregistration.

When, as the event being the causing factor for the misregistration, the setting of the paper feed section 41 is changed between the sample print timing and the preceding sample print timing, the registration image can be combined with each of the front and back sample images to allow the image forming section 43 to form the front and back combined images, respectively, so as to output the front and back combined images. As a result, the misregistration caused on the front and the back of the paper sheet P can be checked when the setting of the paper feed section 41 is changed, which easily causes the misregistration.

When the command information (user command) that the registration image is combined with each of the front and back sample images is received, the registration image can be combined with each of the front and back sample images to form and output the front and back combined images, respectively. As a result, the registration image can be combined with each of the front and back sample images to form and output the front and back combined images, respectively, according to the user command.

When the paper sheet P on which the front and back sample images are formed is output, and the adjustment instruction information on a position of the front image formed on the front and/or a position of the back image formed on the back of the paper sheet P is received, the position of the front image and/or the position of the back image formed on the paper sheet P can be adjusted according to the adjustment instruction information. As a result, as soon as the misregistration caused on the front and the back of the paper sheet P is found, the misregistration can be adjusted so as to output a paper sheet P having no misregistration.

When the paper sheet P on which the front and back sample images are formed is output, and the instruction information on continuation of a job is received, the job being executed can be continued. When the paper sheet P on which the front and back sample images are formed is output, and the instruction information on cancellation of a job is received, the job being executed can be cancelled so as to end the job.

In the embodiment described above, the nonvolatile memory 121 is used as a computer readable medium of the present invention. However, the computer readable medium which can be used for the present invention is not limited to the nonvolatile memory 121. For example, a nonvolatile memory such as a flash memory and a portable recording medium such as a CD-ROM can be used as the computer readable medium of the present invention. Furthermore, as a medium for providing the data of the programs of the present invention via a communication line, a carrier wave can be used, for example.

The present invention is not limited to the embodiment described above, and can be changed without departing from the scope of the present invention.

According to a first aspect of the preferred embodiment of the present invention, there is provided an image forming apparatus 1 including: an image forming section 43 to form a front image on a front and/or a back image on a back of a paper sheet P based on job information of a job; and a control section 110 to combine a registration image for judging misregistration of the front and back images with each of front and back sample images of the job to allow the image forming section 43 to form front and back combined images on the front and the back of the paper sheet P, respectively, on which the front and back sample images are to be formed, respectively, when the image forming section 43 forms the sample images at a preset sample print timing.

According to a second aspect of the preferred embodiment of the present invention, there is provided a control method of an image forming apparatus 1 having an image forming section 43 to form a front image on a front and/or a back image on a back of a paper sheet P, the control method including the steps of: receiving job information of a job; and combining a registration image for judging misregistration of the front and back images with each of front and back sample images of the job to allow the image forming section 43 to form front and back combined images on the front and the back of the paper sheet P, respectively, on which the front and back sample images are to be formed, respectively, when the image forming section 43 forms the sample images at a preset sample print timing.

By the image forming apparatus 1 or the control method thereof, output of the dedicated paper sheet for misregistration check to check the misregistration of a front image formed on the front and a back image formed on the back of a paper sheet P is not required. In addition, since the registration image is formed with each of the front and back sample images, a user can easily find the misregistration caused on the front and the back of the paper sheet P in detail. Furthermore, since a timing to check the misregistration caused on the front and the back of the paper sheet P is the sample print timing, the misregistration can be checked regularly. Therefore, working efficiency for checking the misregistration caused on the front and the back of the paper sheet P can be improved.

Preferably, in the image forming apparatus 1, when the job being executed at the sample print timing is set to a both-sided mode for forming the front and back images on the front and the back of the paper sheet P, respectively, the control section 110 combines the registration image with each of the front and back sample images to allow the image forming section 43 to form the front and back combined images on the front and the back of the paper sheet P, respectively.

Preferably, in the control method thereof, when the job being executed at the sample print timing is set to a both-sided mode for forming the front and back images on the front and the back of the paper sheet P, respectively, the registration image is combined with each of the front and back sample images to allow the image forming section 43 to form the front and back combined images on the front and the back of the paper sheet P, respectively.

Consequently, when the job in the both-sided mode is executed, and the front and back sample images are formed and output, the front and back sample images and the misregistration caused on the front and the back of the paper sheet P can be checked at the same time.

Preferably, in the image forming apparatus 1, when an event being a causing factor for the misregistration of the front and back images formed on the front and the back of the paper sheet P, respectively, occurs before the sample print timing, the control section 110 combines the registration image with each of the front and back sample images to allow the image forming section 43 to form the front and back combined images on the front and the back of the paper sheet P, respectively.

Preferably, in the control method thereof, when an event being a causing factor for the misregistration of the front and back images formed on the front and the back of the paper sheet P, respectively, occurs before the sample print timing, the registration image is combined with each of the front and back sample images to allow the image forming section 43 to form the front and back combined images on the front and the back of the paper sheet P, respectively.

Consequently, the misregistration is not unnecessarily checked, and also early detection of the misregistration can be facilitated.

Preferably, in the image forming apparatus 1 and the control method thereof, the event being the causing factor is an event which executes a job set to a single-sided mode before the job set to the both-sided mode is executed at the sample print timing.

Consequently, when a job in the single-sided mode is executed before a job in the both-sided mode which is being executed at a timing at which the image forming section 43 forms the front and back sample images to output the front and back sample images, the registration image can be combined with each of the front and back sample images to allow the image forming section 43 to form the front and back combined images, respectively, so as to output the front and back combined images.

Preferably, in the image forming apparatus 1 and the control method thereof, the event being the causing factor is an event which adjusts a position of the front image formed on the front and/or a position of the back image formed on the back of the paper sheet P between the sample print timing and the preceding sample print timing.

Consequently, when the processing to adjust a position of the front image formed on the front and/or a position of the back image formed on the back of the paper sheet P is executed between a timing and the preceding timing, the registration image can be combined with each of the front and back sample images to allow the image forming section 43 to form the front and back combined images, respectively, so as to output the front and back combined images, the timing at which the image forming section 43 forms the front and back sample images to output the front and back sample images.

Preferably, the image forming apparatus 1 further includes a paper feed section 41 including a plurality of paper feed trays 41*a* in each of which a different kind of paper sheet P is placed, the paper feed section 41 to convey the paper sheet P one by one from the plurality of paper feed trays 41*a* to the image forming section 43, wherein the event being the causing factor is an event which changes a setting of the paper feed section 41 between the sample print timing and the preceding sample print timing.

Preferably, in the control method thereof, the event being the causing factor is an event which changes a setting of a paper feed section 41 to convey a paper sheet P one by one from a plurality of paper feed trays 41*a*, in each of which a different kind of the paper sheet P is placed, to the image forming section 43 between the sample print timing and the preceding sample print timing.

Consequently, when the setting of the paper feed section 41 is changed between a timing and the preceding timing, the registration image can be combined with each of the front and back sample images to allow the image forming section 43 to form the front and back combined images, respectively, so as to output the front and back combined images, the timing at which the image forming section 43 forms the front and back sample images to output the front and back sample images.

Preferably, the image forming apparatus 1 further includes a registration image combining command input section to receive command information for combining the registration image with each of the front and back sample images, wherein when the command information is received by the registration image combining command input section, the control section 110 combines the registration image with each of the front and back sample images to allow the image forming section 43 to form the front and back combined images on the front and the back of the paper sheet P, respectively.

Preferably, the control method thereof further includes the step of: receiving command information for combining the registration image with each of the front and back sample images, wherein when the command information is received, the registration image is combined with each of the front and back sample images to allow the image forming section 43 to form the front and back combined images on the front and the back of the paper sheet P, respectively.

Consequently, when the command information (user command) that the registration image is combined with each of the front and back sample images is received, the registration image can be combined with each of the front and back sample images to form and output the front and back combined images, respectively.

Preferably, the image forming apparatus 1 further includes: an adjustment value input section to receive adjustment instruction information on a position of the front image formed on the front and/or a position of the back image formed on the back of the paper sheet P, wherein when the paper sheet P on which the front and back sample images are formed is output and the adjustment instruction information is received by the adjustment value input section, the control section 110 adjusts the position of the front image and/or the position of the back image according to the adjustment instruction information.

Preferably, the control method thereof further includes the steps of: receiving adjustment instruction information on a position of the front image formed on the front and/or a position of the back image formed on the back of the paper sheet P; and adjusting the position of the front image and/or the position of the back image according to the adjustment instruction information when the paper sheet P on which the front and back sample images are formed is output and the adjustment instruction information is received.

Consequently, when the paper sheet P on which the front and back sample images are formed is output, and the adjustment instruction information on a position of the front image formed on the front and/or a position of the back image formed on the back of the paper sheet P is received, the position of the front image and/or the position of the back image formed on the paper sheet P can be adjusted according to the adjustment instruction information.

Preferably, the image forming apparatus 1 further includes: a job execution instruction input section to receive instruction information on continuation of the job or on cancellation of the job, wherein when the paper sheet P on which the front and back sample images are formed is output and the instruction information on continuation of the job is received by the job execution instruction input section, the control section 110 continues the job being executed at the sample print timing, and wherein when the paper sheet P on which the front and back sample images are formed is output and the instruction information on cancellation of the job is received by the job execution instruction input section, the control section 110 cancels the job being executed at the sample print timing and ends the job.

Preferably, the control method thereof further includes the steps of: receiving instruction information on continuation of the job or on cancellation of the job; continuing the job being executed at the sample print timing when the paper sheet P on which the front and back sample images are formed is output and the instruction information on continuation of the job is received; and cancelling the job being executed at the sample print timing and ending the job when the paper sheet P on which the front and back sample images are formed is output and the instruction information on cancellation of the job is received.

Consequently, when the paper sheet P on which the front and back sample images are formed is output, and the instruction information on continuation of a job is received, the job being executed can be continued. When the paper sheet P on which the front and back sample images are formed is output, and the instruction information on cancellation of a job is received, the job being executed can be cancelled so as to end the job.

According to a third aspect of the preferred embodiment of the present invention, there is provided an image forming apparatus 1 including: an image forming section 43 to form a front image on a front and/or a back image on a back of a paper sheet P based on job information; and a control section 110 to control the image forming section 43 to form front and back sample images on the front and the back of the paper sheet P, respectively, based on a sample page included in the job information, wherein the control section 110 combines a registration image for judging misregistration of the front and back images with each of the front and back sample images to allow the image forming section 43 to form front and back combined images on the front and the back of the paper sheet P, respectively, on which the front and back sample images are to be formed, respectively.

By the image forming apparatus 1, output of the dedicated paper sheet for misregistration check to check the misregistration of a front image formed on the front and a back image formed on the back of a paper sheet P is not required. In addition, since the registration image is formed with each of the front and back sample images, a user can easily find the misregistration caused on the front and the back of the paper sheet P in detail. Therefore, working efficiency for checking the misregistration caused on the front and the back of the paper sheet P can be improved.

Preferably, in the image forming apparatus 1, the control section 110 judges whether an event being a causing factor for misregistration of the front and back images formed on the front and the back of the paper sheet P, respectively, occurs or not, and when the event occurs, the control section 110 combines the registration image with each of the front and back sample images to allow the image forming section 43 to form the front and back combined images on the front and the back of the paper sheet P, respectively.

The present U.S. Patent Application claims priority from Japanese Patent Application No. 2009-104758 filed with Japan Patent Office on Apr. 23, 2009, under the Paris Convention for the Protection of Industrial Property, and the Japanese Patent Application is a ground for correction of mistakes in translation of the present U.S. Patent Application.

What is claimed is:

1. An image forming apparatus comprising:

an image forming section to form an image on either or both sides of a front and a back of a paper sheet based on a job, wherein the image forming section forms a sample image of the job on either or both of the front and the back of the paper sheet at a preset sample print timing; and a control section configured to control the image forming section so as to perform the following operations:

control the image forming section to form front and back sample images combined with a registration image on the front and the back of the paper sheet, when the job being executed at the sample print timing is set to a both-side mode for forming front and back images on the front and the back of the paper sheet, and when an event, which is a causing factor for misregistration of the front and back images formed on the front and the back of the paper sheet, occurs before the sample print timing; and control the image forming section to form the front and back sample images without the registration image on the front and the back of the paper sheet, when the job being executed at the sample print timing is set to a both-side mode for forming the front and back images on the front and the back of the paper sheet, and when the event which is the causing factor doesn't occur before the sample print timing.

2. The image forming apparatus according to claim 1, wherein the event which is the causing factor is an event which executes a job set to a single-sided mode before the job set to the both-sided mode is executed at the sample print timing.

3. The image forming apparatus according to claim 1, wherein the event which is the causing factor is an event which adjusts a position of the front image formed on the front and/or a position of the back image formed on the back of the paper sheet between the sample print timing and the preceding sample print timing.

4. The image forming apparatus according to claim 1, further comprising:

a paper feed section including a plurality of paper feed trays in each of which a different kind of paper sheet is placed, the paper feed section to convey the paper sheet one by one from the plurality of paper feed trays to the image forming section, wherein the event which is the causing factor is an event which changes a setting of the paper feed section between the sample print timing and the preceding sample print timing.

5. The image forming apparatus according to claim 1, further comprising:

a registration image combining command input section to receive command information for combining the registration image with each of the front and back sample images, wherein when the command information is received by the registration image combining command input section, the control section controls the image forming section to form the front and back sample images combined with the registration image on the front and the back of the paper sheet.

6. The image forming apparatus according to claim 1, further comprising:

an adjustment value input section to receive adjustment instruction information on a position of the front image formed on the front and/or a position of the back image formed on the back of the paper sheet, wherein when the paper sheet on which the front and back sample images are formed is output and the adjustment instruction information is received by the adjustment value input section, the control section adjusts the position of the front image and/or the position of the back image according to the adjustment instruction information.

7. The image forming apparatus according to claim 1, further comprising:

a job execution instruction input section to receive instruction information on continuation of the job or on cancellation of the job, wherein when the paper sheet on which the front and back sample images are formed is output and the instruction information on continuation of the job is received by the job execution instruction input section, the control section continues the job being executed at the sample print timing, and wherein when the paper sheet on which the front and back sample images are formed is output and the instruction information on cancellation of the job is received by the job execution instruction input section, the control section cancels the job being executed at the sample print timing and ends the job.

8. A control method of an image forming apparatus having an image forming section to form an image on a single side or both sides of a paper sheet, the control method comprising the steps of:

receiving job information of a job;

forming an image on either or both of a front and a back of a paper sheet based on the job information of the job;

forming a sample image of the job on either or both of the front and the back of the paper sheet at a preset sample print timing;

forming front and back sample images combined with a registration image on the front and the back of the paper sheet, when the job being executed at the sample print timing is set to a both-side mode for forming front and back images on the front and the back of the paper sheet, and when an event, which is a causing factor for misregistration of the front and back images formed on the front and the back of the paper sheet, occurs before the sample print timing; and forming the front and back sample images without the registration image on the front and the back of the paper sheet, when the job being executed at the sample print timing is set to a both-side mode for forming the front and back images on the front and the back of the paper sheet, and when the event which is the causing factor doesn't occur before the sample print timing.

9. The control method of the image forming apparatus according to claim 8, wherein the event which is the causing factor is an event which executes a job set to a single-sided mode before the job set to the both-sided mode is executed at the sample print timing.

10. The control method of the image forming apparatus according to claim 8, wherein the event which is the causing factor is an event which adjusts a position of the front image formed on the front and/or a position of the back image formed on the back of the paper sheet between the sample print timing and the preceding sample print timing.

11. The control method of the image forming apparatus according to claim 8, wherein the event which is the causing factor is an event which changes a setting of a paper feed section to convey a paper sheet one by one from a plurality of paper feed trays, in each of which a different kind of the paper sheet is placed, to the image forming section between the sample print timing and the preceding sample print timing.

12. The control method of the image forming apparatus according to claim 8, the control method further comprising the step of:

receiving command information for combining the registration image with each of the front and back sample images, wherein when the command information is received, forming the front and back sample images combined with the registration image on the front and the back of the paper sheet.

13. The control method of the image forming apparatus according to claim 8, the control method further comprising the steps of:

receiving adjustment instruction information on a position of the front image formed on the front and/or a position of the back image formed on the back of the paper sheet; and adjusting the position of the front image and/or the position of the back image according to the adjustment instruction information when the paper sheet on which the front and back sample images are formed is output and the adjustment instruction information is received.

14. The control method of the image forming apparatus according to claim 8, the control method further comprising the steps of:

receiving instruction information on continuation of the job or on cancellation of the job;

continuing the job being executed at the sample print timing when the paper sheet on which the front and back sample images are formed is output and the instruction information on continuation of the job is received; and cancelling the job being executed at the sample print timing and ending the job when the paper sheet on which the front and back sample images are formed is output and the instruction information on cancellation of the job is received.

* * * * *